United States Patent
Zhang et al.

(10) Patent No.: US 9,477,657 B2
(45) Date of Patent: Oct. 25, 2016

(54) REAL TIME MULTI-LANGUAGE VOICE TRANSLATION

(71) Applicant: Verizon Patent and Licensing Inc., Arlington, VA (US)

(72) Inventors: Gong Zhang, Waltham, MA (US); Jian Huang, Sudbury, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 34 days.

(21) Appl. No.: 14/302,192

(22) Filed: Jun. 11, 2014

(65) Prior Publication Data

US 2015/0363389 A1   Dec. 17, 2015

(51) Int. Cl.
*G06F 17/28* (2006.01)
*H04N 21/41* (2011.01)
*H04N 21/4402* (2011.01)
*H04N 21/45* (2011.01)
*G10L 13/00* (2006.01)

(52) U.S. Cl.
CPC ........ *G06F 17/289* (2013.01); *H04N 21/4126* (2013.01); *H04N 21/440236* (2013.01); *H04N 21/4532* (2013.01); *G10L 13/00* (2013.01)

(58) Field of Classification Search
USPC ...................................... 704/2–10
See application file for complete search history.

(56) References Cited

U.S. PATENT DOCUMENTS

| | | | | |
|---|---|---|---|---|
| 7,054,804 B2 * | 5/2006 | Gonzales | ............. | G06F 17/289 704/8 |
| 8,549,569 B2 * | 10/2013 | Casagrande | ............. | H04N 5/04 348/500 |
| 2003/0216922 A1 * | 11/2003 | Gonzales | ............. | G06F 17/289 704/260 |
| 2010/0194979 A1 * | 8/2010 | Blumenschein | ...... | G06F 17/289 348/468 |
| 2011/0022379 A1 * | 1/2011 | Bangalore | ............. | G06F 17/289 704/3 |
| 2011/0246172 A1 * | 10/2011 | Liberman | ............. | G06F 17/289 704/2 |
| 2013/0080384 A1 * | 3/2013 | Briggs | ............. | G06F 17/30026 707/610 |
| 2014/0201631 A1 * | 7/2014 | Pornprasitsakul | .... | G06F 3/0484 715/716 |
| 2014/0303958 A1 * | 10/2014 | Lee | ........ | G06F 17/289 704/2 |
| 2015/0154183 A1 * | 6/2015 | Kristjansson | ......... | G06F 17/289 704/3 |

* cited by examiner

*Primary Examiner* — Leonard Saint Cyr (57) ABSTRACT

A system may be configured to allow for the translation of content, obtained and/or presented by a media cast device, to different languages. The translation may be performed based on translating the text of closed captioning information provided with the content, and generating audio based on the text. The translation may be performed independent of music or sound effects, such that only speech is replaced, without affecting other portions of the audio.

20 Claims, 9 Drawing Sheets

REAL TIME MULTI-LANGUAGE VOICE TRANSLATION

BACKGROUND

Media cast devices may be used to access web-based content, such as Internet video content, and "cast" the content to a display device, such as a television. Content may often be presented with closed captions, which may be a textual representation of audio associated with the content. Closed captions are generally provided in a single language.

DETAILED DESCRIPTION OF PREFERRED EMBODIMENTS

The following detailed description refers to the accompanying drawings. The same reference numbers in different drawings may identify the same or similar elements.

Media cast devices may be used to access web-based content, such as Internet video content, on-demand programming, and/or other types of content. Situations may arise in which multiple different users desire to access content, via the same cast device (e.g., in the same room and/or the same household). In some of these situations, the different users may desire to listen to audio in different languages. For instance, one user may only understand English, while another user may only understand Spanish.

Figure 1:
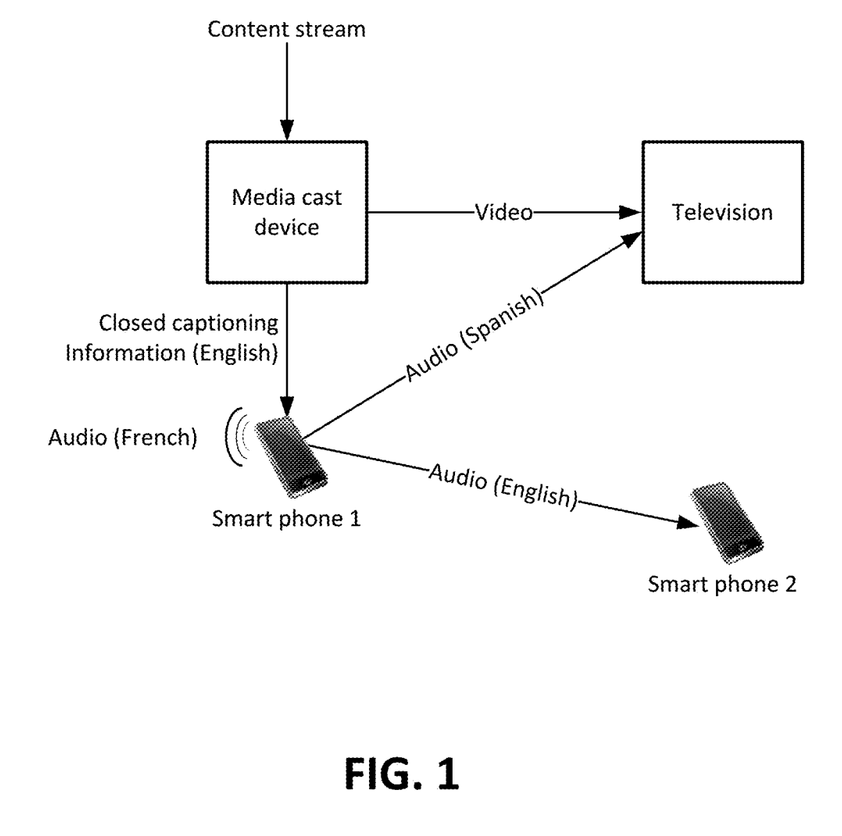
FIGS. 1 and 2 illustrate an example overview of one or more implementations described herein.

As provided herein, some implementations may allow for the presentation of different audio streams for content accessed via a media cast device. For example, as shown in FIG. 1, a media cast device may receive a content stream (e.g., a video content stream from an Internet-based video content provider). The content stream may include, for example, video, audio, and closed captioning information. The audio and the closed captioning information may be, for instance, in the same language (e.g., English). Assume that three users desire to watch the content, but that the users desire to listen to the audio of the content in three different languages: French, Spanish, and English.

In accordance with some implementations, the media cast device may provide a video portion of the content stream to a television, and audio, in different languages, may be played by one or more other devices (e.g., smart phones associated with different users). For instance, the media cast device may output closed captioning information (e.g., the closed captioning information originally included in the content stream) to a first smart phone ("Smart phone 1"). As described below, the first smart phone may include a translation component, which may translate text, associated with the English closed captioning information, to text in other languages (i.e., Spanish and French, in this example). The translation component may perform a text-to-speech conversion technique, in order to generate audio tracks (i.e., Spanish and French audio tracks, in this example), based on the translated text. The first smart phone may output the generated audio tracks in accordance with user preferences. For example, the Spanish audio track may be provided to the television, the English audio track may be provided to a second smart phone ("Smart phone 2"). Further, the French audio track may be played at the first smart phone.

As described below, different audio tracks, corresponding to different portions of audio, may be provided. For example, the content stream may be associated with a speech audio track and a separate music and sound effects audio track. The translation component may, in some implementations, replace the speech audio track with translated speech, while leaving the other audio track(s) unaffected, thereby preserving as much of the original audio as possible. In some implementations, the translation component may intelligently replace audio, in situations where separate speech and music/sound effects tracks are not provided. For example, when multiple audio channels are provided (e.g., center, left, right, rear left, and rear right), the translation component may replace one audio channel with translated speech (e.g., the center channel) while leaving the other channels unaffected. In other implementations, the translation component may perform other types of processing in order to preserve as much of the original sound track as possible, while translating the speech.

Figure 2:
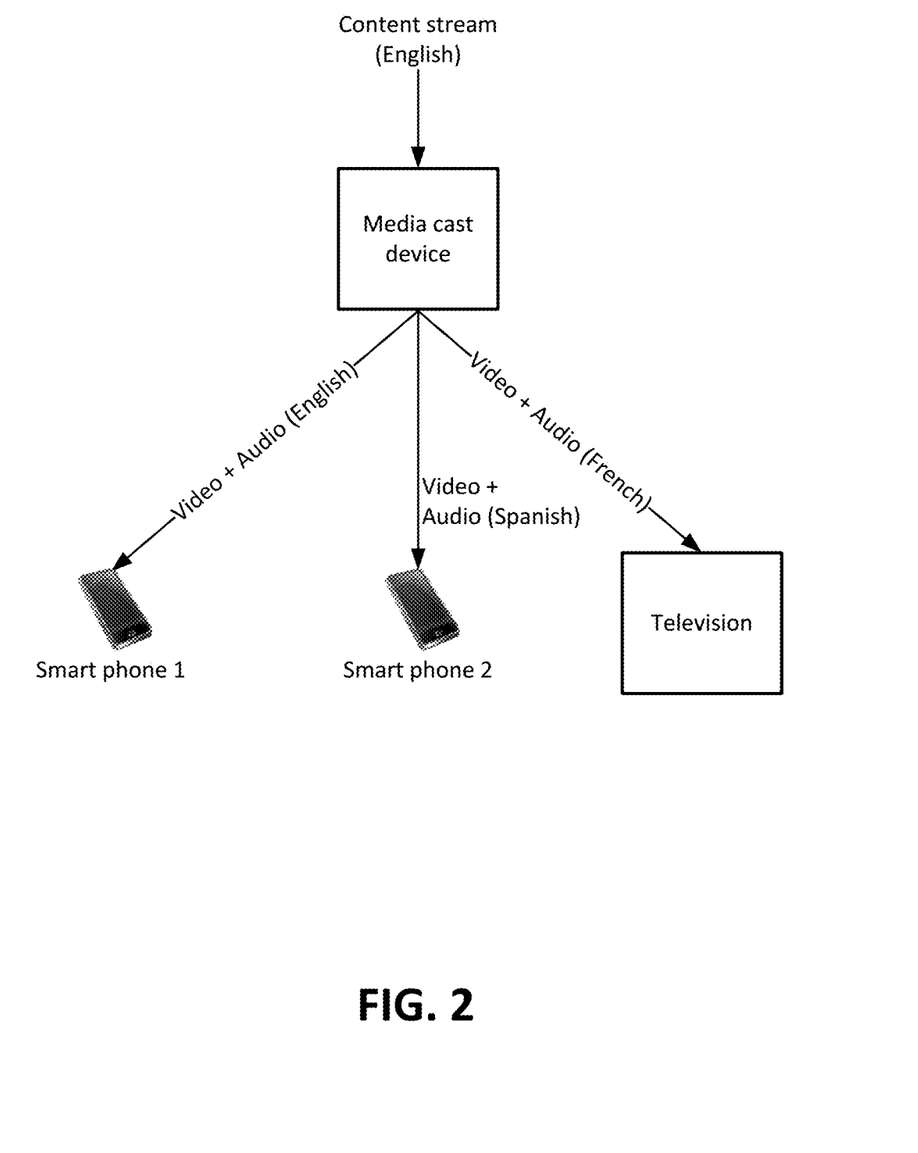

FIG. 2 illustrates an overview of another example implementation. As shown in FIG. 2, the media cast device may output video and translated audio to multiple different devices (e.g., Smart phone 1, Smart phone 2, and a television). In the example illustrated in FIG. 2, the media cast device may include a translation component, which may perform similar functionality as described above.

Figure 3:
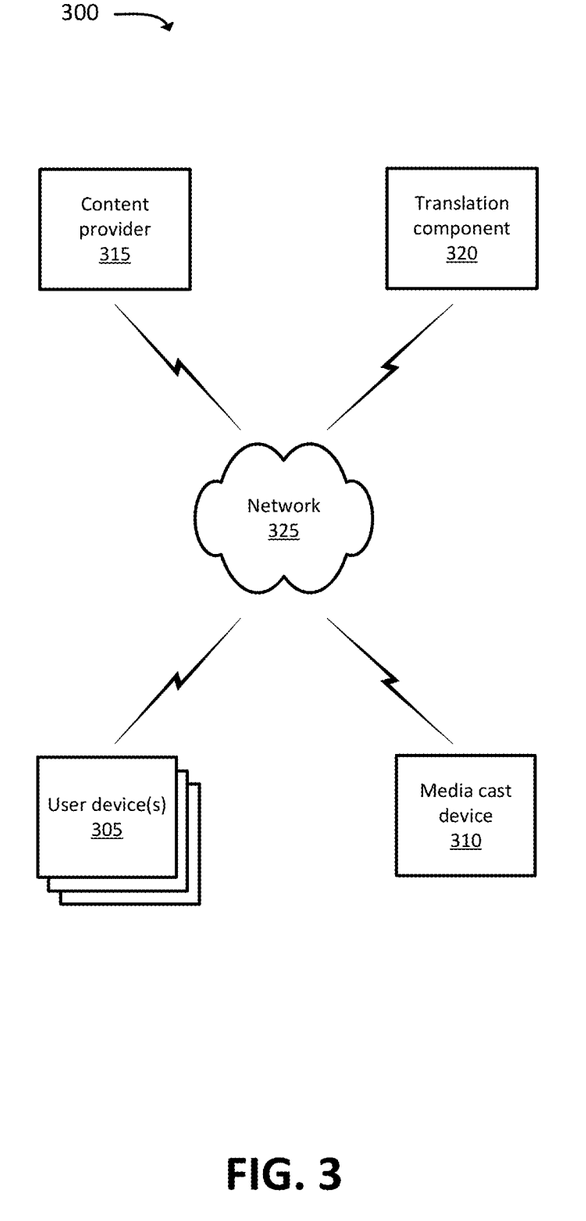
FIG. 3 illustrates an example of an environment, in which systems and/or methods, described herein, may be implemented.

FIG. 3 illustrates an example environment 300, in which systems and/or methods described herein may be implemented. As shown in FIG. 3, environment 300 may include one or more user devices 305, media cast device 310, content provider 315, translation component 320, and network 325. The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections.

User device 305 may include any computation and communication device, such as a wireless mobile communication device that is capable of communicating with one or more networks (e.g., network 325). For example, user device 305 may include a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a television, a set-top device ("STD"), a personal gaming system, a wearable device, and/or another type of mobile computation and communication device. User device 305 may receive connectivity to network 325 via services provided by a service provider, such as an Internet service provider ("ISP"). An ISP may, in some implementations, be a wireless telecommunications provider (e.g., a cellular telecommunications provider).

User device 305 may be used as a control device and/or as a presentation device. For example, as described herein, when used as a control device, user device 305 may provide instructions to media cast device 310 to obtain content, such as web-based video content. When used as a presentation device, user device 305 may present (e.g., via a display device and/or via an audio output device, such as a set of speakers) web-based content obtained by media cast device 310. As described herein, user device 305 may, in some implementations, include translation component 320, or may implement a portion of translation component 320. In some implementations, user device 305 may include some or all of media cast device 310.

Media cast device 310 may include a computation and communication device, which may obtain content, such as web-based video content, from content provider 315. For example, media cast device 310 may be communicatively coupled to a control device, which may instruct media cast device 310 to obtain particular content from content provider 315. Media cast device 310 may also be communicatively coupled to a presentation device, to which media cast device 310 may provide some or all of the obtained content. Media cast device 310 may further be communicatively coupled to translation component 320, to which media cast device 310 may provide portions of obtained content (e.g., audio information and/or closed captioning information). As described herein, media cast device 310 may, in some implementations, include translation component 320, or may implement a portion of translation component 320.

Content provider 315 may include one or more devices that provide content to media cast device 310. For example, content provider 315 may be associated with a subscription-based service, via which content (such as on-demand video programming content) may be obtained. Content provider 315 may output requested content to media cast device 310. As described below, the content may be outputted as a set of logical streams, such as a video stream, one or more audio streams, and a closed captioning stream.

Translation component 320 may include one or more devices that generate one or more translated audio streams based on content obtained from content provider 315. In some implementations, translation component 320 may be implemented as part of user device 305 (e.g., may be implemented via logic and/or hardware associated with user device 305). In some implementations, translation component 320 may be implemented as part of media cast device 310 (e.g., may be implemented via logic and/or hardware associated with media cast device 310). In some implementations, translation component 320 may be implemented separately from user device 305 and/or media cast device 310. As described below, translation component 320 may perform a text-based translation of speech-related audio, and may perform text-to-speech conversion techniques, in order to generate translated audio streams.

Network 325 may include one or more networks, via which user device 305, media cast device 310, content provider 315, and/or translation component 320 may communicate. For example, network 325 may include an evolved packet system ("EPS") that includes a Long Term Evolution ("LTE") network and/or an evolved packet core ("EPC") network that operate based on a third generation partnership project ("3GPP") wireless communication standard. The LTE network may be, or may include, a radio access network ("RAN") that includes one or more base stations, some or all of which may take the form of an eNodeB ("eNB"), via which user device 305 and/or another device may communicate with the EPC network. The EPC network may include one or more serving gateways ("SGWs"), mobility management entities ("MMEs"), and/or packet data network ("PDN") gateways ("PGWs"), and may enable user device 305 to communicate with a PDN (e.g., the Internet) and/or an IP Multimedia Subsystem ("IMS") core network. The IMS core network may manage authentication, session initiation, account information, a user profile, etc. associated with user device 305.

Network 325 may additionally, or alternatively, include a wide area network ("WAN"), a metropolitan area network ("MAN"), the Internet, a fiber optic-based network, and/or a combination of these or other types of networks. Network 325 may include one or more wireless networks in addition to, or in lieu of, an LTE network. For example, network 325 may include a Code Division Multiple Access ("CDMA") 2000 1× network, a second generation ("2G") wireless network, a third generation ("3G") wireless network, a fourth generation ("4G") wireless network, a fifth generation ("5G") wireless network, a "Wi-Fi" wireless network (e.g., a network that operates according to an Institute of Electrical and Electronics Engineers ("IEEE") 802.11-based standard), and/or another wireless network. In some implementations, network 325 may be communicatively coupled to one or more other networks.

Figure 4:
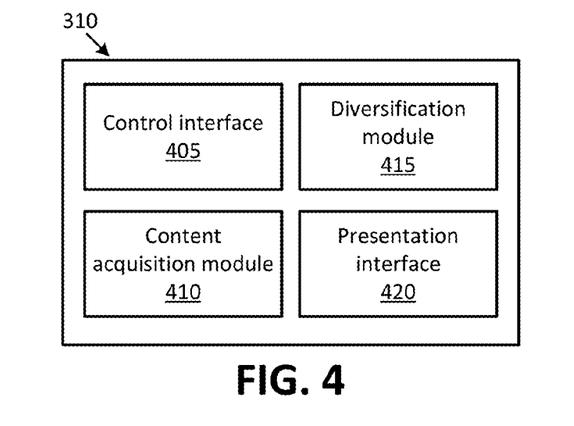
FIG. 4 illustrates example components of a media cast device, in accordance with some implementations.

FIG. 4 illustrates example functional components of media cast device 310, in accordance with some implementations. As shown, media cast device 310 may include control interface 405, content acquisition module 410, diversification module 415, and presentation interface 420. In other implementations, media cast device 310 may include additional, fewer, different, and/or differently arranged modules. Further, some, or all, of the functionality of one or more modules may be performed by one or more other modules.

Control interface 405 may serve as an interface between media cast device 310 and a control device. For example, as mentioned above, the control device may be, or may be implemented by, user device 305. Control interface 405 may be an implementation of an application programming interface ("API"), via which control interface 405 can receive instructions (such as instructions to obtain particular content) from a control device. Media cast device 310 may output information to the control device, such as closed captioning and/or audio data that corresponds to obtained content. For example, as described below, diversification module 415 may identify or extract the closed captioning and/or audio data to provide to the control device.

Content acquisition module 410 may include an interface (e.g., an IP interface and/or an implementations of another API) between media cast device 310 and content provider 315. Content acquisition module 410 may request and receive content, based on instructions received from a control device. As mentioned above, particular content may be associated with multiple logical streams, such as a video stream, an audio stream, and/or a closed captioning stream.

As described below, the obtained content may, in some situations, not include closed captioning information.

Figure 5:
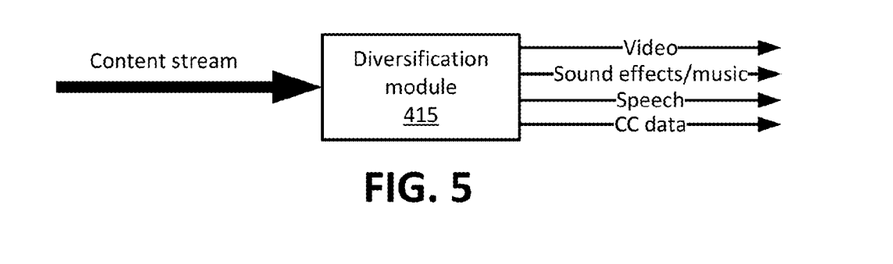
FIG. 5 illustrates an example of the operation of a diversification module, in accordance with some implementations.

Diversification module 415 may diversify streams corresponding to content, obtained via content acquisition module 410. For example, diversification module 415 may identify, or extract, different streams associated with the obtained content. Diversification module 415 may, in some implementations, include a set of decoders and/or other type of logic that are capable of identifying audio, video, and/or closed captioning portions of content obtained from content provider 315. An example of the operation of diversification module 415 is shown in FIG. 5. As shown, diversification module 415 may receive a content stream (e.g., as obtained from content provider 315). Diversification module 415 may distinctly output a video portion of the stream, one or more audio portions of the stream (e.g., one audio portion that corresponds to sound effects and/or music, and another audio portion that corresponds to speech), and closed captioning ("CC") data.

In some implementations, the content stream, received from content provider 315, may include metadata, or other identifying information, based on which diversification module 415 may be able to differentiate speech audio from other types of audio (e.g., sound effects and/or music). In some implementations, the content stream, received from content provider 315, may not include such metadata. In some such implementations, diversification module 415 may intelligently extract speech-related audio content from the content stream. For example, diversification module 415 may extract audio, relating to certain frequencies (such as frequencies that are commonly associated with human speech), as the speech-related audio stream. As another example, the audio content (received from media cast device 310) may include multiple different channels, which may correspond to different portions of a "surround sound" configuration (such as a "3.1" configuration, a "5.1" configuration, a "7.1" configuration, etc.). Diversification module 415 may heuristically or intelligently identify one or more channels as a speech-related channel. For example, diversification module 415 may identify or denote that a "center" channel should be considered to be a speech-related audio channel. Diversification module 415 may, in other implementations, extract the speech-related audio stream using one or more other techniques. In some implementations, diversification module 415 may forgo identifying separate speech-related and sound effects/music audio streams.

Returning to FIG. 4, presentation interface 420 may be an implementation of an API, and/or another type of interface, via which media cast device 310 may communicate with a presentation device (such as a particular user device 305). Media cast device 310 may output, via presentation interface 420, video content and/or audio content (such as a sound effects/music stream and/or a speech-related audio stream) to the presentation device.

Figure 6:
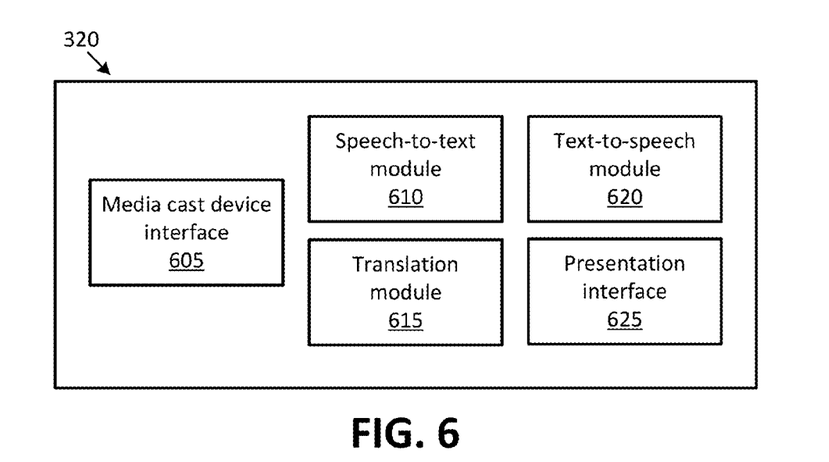
FIG. 6 illustrates example components of a translation component, in accordance with some implementations.

FIG. 6 illustrates example functional components of translation component 320, in accordance with some implementations. As mentioned above, translation component 320 may be implemented as part of user device 305 and/or as part of media cast device 310, or as a separate device. As shown, translation component 320 may include media cast device interface 605, speech-to-text module 610, translation module 615, text-to-speech module 620, and presentation interface 625. In other implementations, translation component 320 may include additional, fewer, different, and/or differently arranged modules. Further, some, or all, of the functionality of one or more modules may be performed by one or more other modules.

Media cast device interface 605 may be an implementation of an API, and/or another type of interface, via which translation component 320 receives audio and/or closed captioning information from media cast device 310. The audio may, for example, correspond to speech-related audio content. In some implementations, translation component 320 may receive closed captioning information from media cast device 310 and may not receive audio content from media cast device 310, while in some implementations, translation component 320 may receive audio content from media cast device 310 and may not receive closed captioning information from media cast device 310. In some implementations, translation component 320 may receive both audio content and closed captioning information from media cast device 310.

In situations where translation component 320 receives speech-related audio content from media cast device 310, speech-to-text module 610 may perform speech recognition and/or other techniques in order to generate a textual representation of speech, associated with the audio content. In some implementations, media cast device interface 605 may include synchronization information when generating text, based on speech, such that the timing of the speech may be preserved. As mentioned above, in some implementations, translation component 320 may not receive speech-related audio content, and/or may receive closed captioning information. In some such implementations, speech-to-text module 610 may not perform speech-to-text functions, and/or may not be present.

Translation module 615 may translate text that corresponds to speech, associated with audio content. For example, translation module 615 may translate text generated by speech-to-text module 610, and/or may translate closed captioning text from one language to another. Translation module 615 may perform the translation based on a set of preferences (e.g., user preferences) that specify which language or languages to which the text should be translated. In some implementations, speech-to-text module 610 may synchronize the translated text based on synchronization information included in the closed captioning information (e.g., information specifying when certain text should be displayed) and/or based on synchronization information generated by speech-to-text module 610. Additionally, or alternatively, the translation may be performed in "real time." For example, when translation module 615 receives text, translation module 615 may perform the translation as quickly as possible (e.g., may not intentionally introduce any delay when generating the translation).

Text-to-speech module 620 may generate audio based on the translated text generated by translation module 615. The generated audio may, thus, correspond to translated audio based on the original audio provided by media cast device 310. The audio may be generated in "real time" (e.g., as soon as text-to-speech module 620 receives the text generated by translation module 615).

Presentation interface 625 may be an implementation of an API, and/or another type of interface, via which translation component 320 communicates with one or more presentation devices (e.g., one or more user devices 305). Translation component 320 may output the translated audio (e.g., as generated by text-to-speech module 620) and/or other content (e.g., video content, sound effects/music audio content, etc.) to a presentation device. Translation component 320 may output the content, via presentation interface

625, based on preferences or configuration settings, which specify which presentation device(s) are associated with which language(s). Since the various components of translation component 320 may act in real time or near-real time, the translated audio may be provided to presentation devices in real time and/or near-real time. Thus, multiple different presentations devices my receive video and/or translated audio content at approximately the same time, thus potentially giving multiple users a shared viewing experience of content associated with different languages. Network bandwidth (e.g., bandwidth associated with a connection between media cast device 310 and content provider 315) may be saved, compared to implementations where content provider 315 provides multiple audio streams (e.g., that correspond to different languages). Further, translation component 320 may provide enhanced functionality, such as translation to languages not offered by content provider 315.

Figure 7:
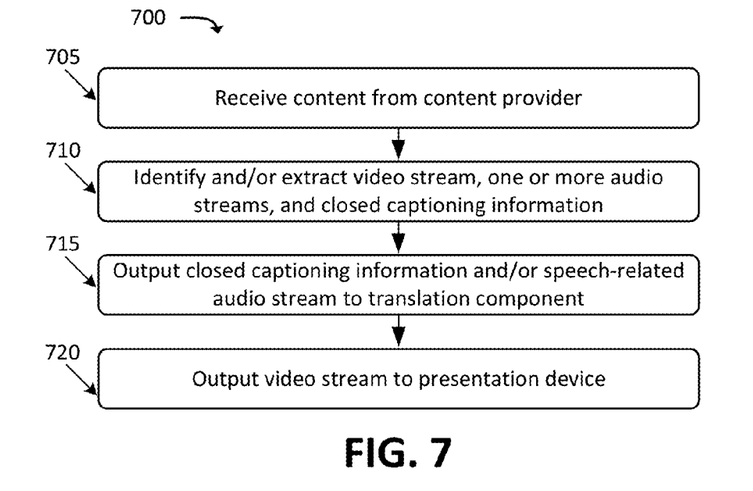
FIG. 7 illustrates an example process for providing a video stream to a presentation device and closed captioning and/or speech-related audio to a user device.

FIG. 7 illustrates an example process 700 for outputting video to a presentation device, as well as audio and/or closed captioning information to a translation component. Process 700 may, in some implementations, be performed by media cast device 310. In other implementations, some or all of process 700 may be performed by one or more other devices.

Process 700 may include receiving (at 705) content from a content provider. For example, as described above with respect to content acquisition module 410, media cast device 310 may obtain content from content provider 315. The content may be obtained based on, for example, an instruction received from a control device.

Process 700 may also include identifying and/or extracting (at 710) a video stream, one or more audio streams, and closed captioning information. For example, as discussed above with respect to diversification module 415, media cast device 310 may identify and/or extract video, audio, and/or closed captioning information from the content received from content provider 315. As also discussed above, in some situations, distinct audio streams (e.g., separate speech-related audio content and sound effects/music content) may not be identified or extracted, and/or closed captioning information may not be identified and/or extracted.

Process 700 may further include outputting (at 715) closed captioning information and/or a speech-related audio stream to a translation component. For example, as described above with respect to control interface 405, the extracted or identified closed captioning information and/or speech-related audio stream may be provided to translation component 320.

Process 700 may additionally include outputting (at 720) a video stream to a presentation device. For example, as described above with respect to presentation interface 420, media cast device 310 may output a video portion of the content, obtained from content provider 315, to a particular user device 305 that acts as a presentation device. In some implementations, media cast device 310 may output the video stream to multiple user devices 305, to one or more control devices, and/or to translation component 320.

Figure 8:
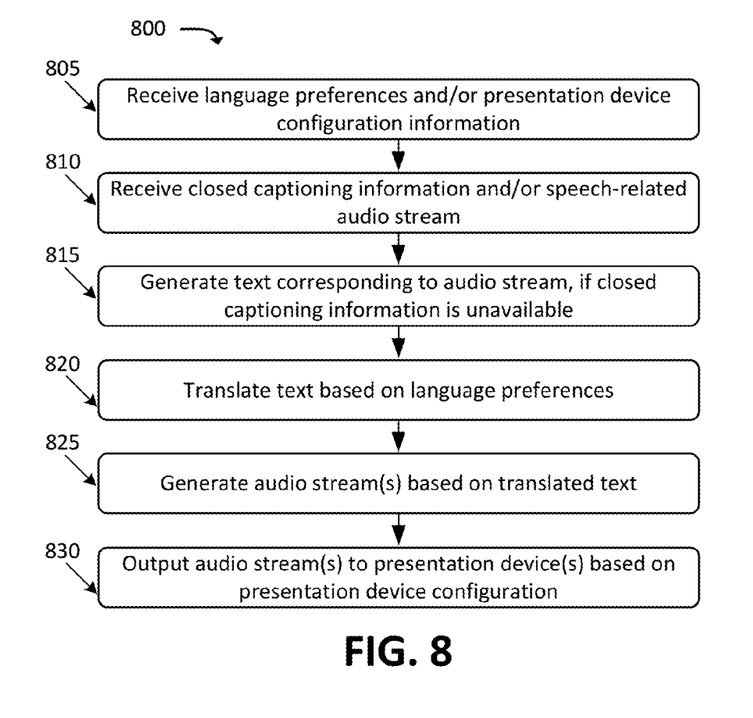
FIG. 8 illustrates an example process for generating and outputting multiple translated audio streams.

FIG. 8 illustrates an example process 800 for generating and outputting translated audio streams for presentation by one or more presentation devices. Process 800 may, in some implementations, be performed by translation component 320. In other implementations, some or all of process 800 may be performed by one or more other devices.

Process 800 may include receiving (at 805) a set of language preferences and/or presentation device configuration information. For example, translation component 320 may receive the language preferences and/or presentation device configuration information from a user of translation component 320. The language preferences and/or presentation device configuration information may specify a set of languages, and the presentation device configuration may specify which language(s) correspond to which presentation devices. The presentation device configuration may specify, for example, that a first user device 305 is associated with a first language, that a second user device 305 is associated with a second language, and so on. In some implementations, one presentation device may be associated with multiple languages. In some such implementations, the presentation device may further process or output multiple translated audio streams in a manner determined by, for example, a user of the presentation device (e.g., one audio stream may be played via a first set of headphones while the other audio stream is played via a second set of headphones, etc.).

Process 800 may also include receiving (at 810) closed captioning information and/or a speech-related audio stream. For example, as described above with respect to media cast device interface 605, translation component 320 may receive the closed captioning information and/or speech-related audio from media cast device 310.

Process 800 may further include generating (at 815) text corresponding to the audio stream, if closed captioning information is unavailable. For instance, as described above with respect to speech-to-text module 610, translation component 320 may perform speech recognition in order to generate a textual representation of speech, associated with the audio. In some implementations, text may not be generated (at 815), such as when closed captioning information is received (at 810).

Process 800 may additionally include translating (at 820) the text based on language preferences. For example, as described above with respect to text-to-speech module 620, translation component 320 may translate the text (received at 810 or generated at 815) to text associated with one or more other languages, as specified in the language preferences.

Process 800 may also include generating (at 825) one or more audio streams based on the translated text. For example, as described above with respect to text-to-speech module 620, translation component 320 may generate audio (e.g., "translated audio"), in real time, based on the translated text.

Process 800 may further include outputting (at 830) the one or more audio streams to one or more presentation devices based on the presentation device configuration. For example, as described above with respect to text-to-speech module 620, translation component 320 may output translated audio to the one or more presentation devices in the manner specified by the presentation device configuration information.

Figure 9:
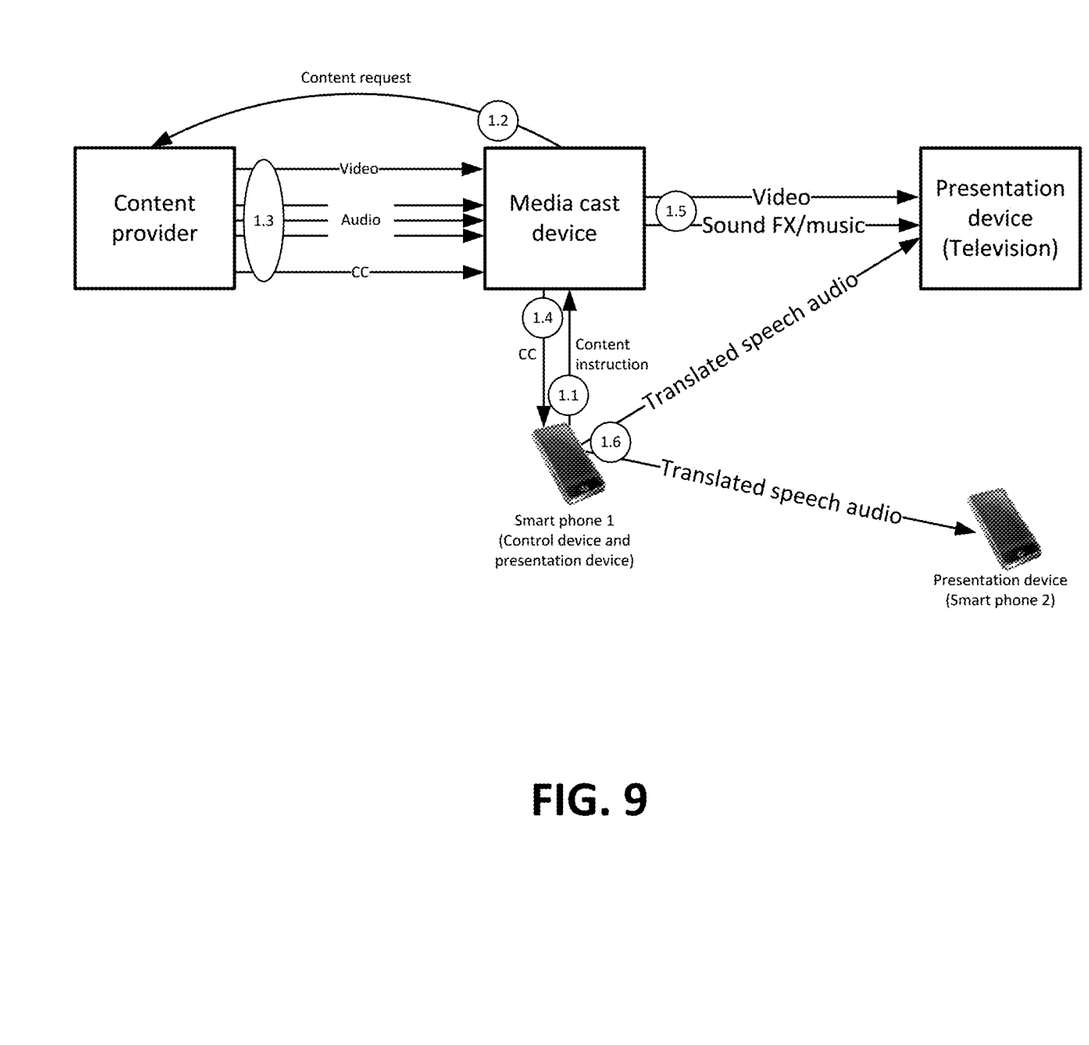
FIGS. 9-11 illustrate example implementations of generating and outputting multiple translated audio streams.
Figure 10:
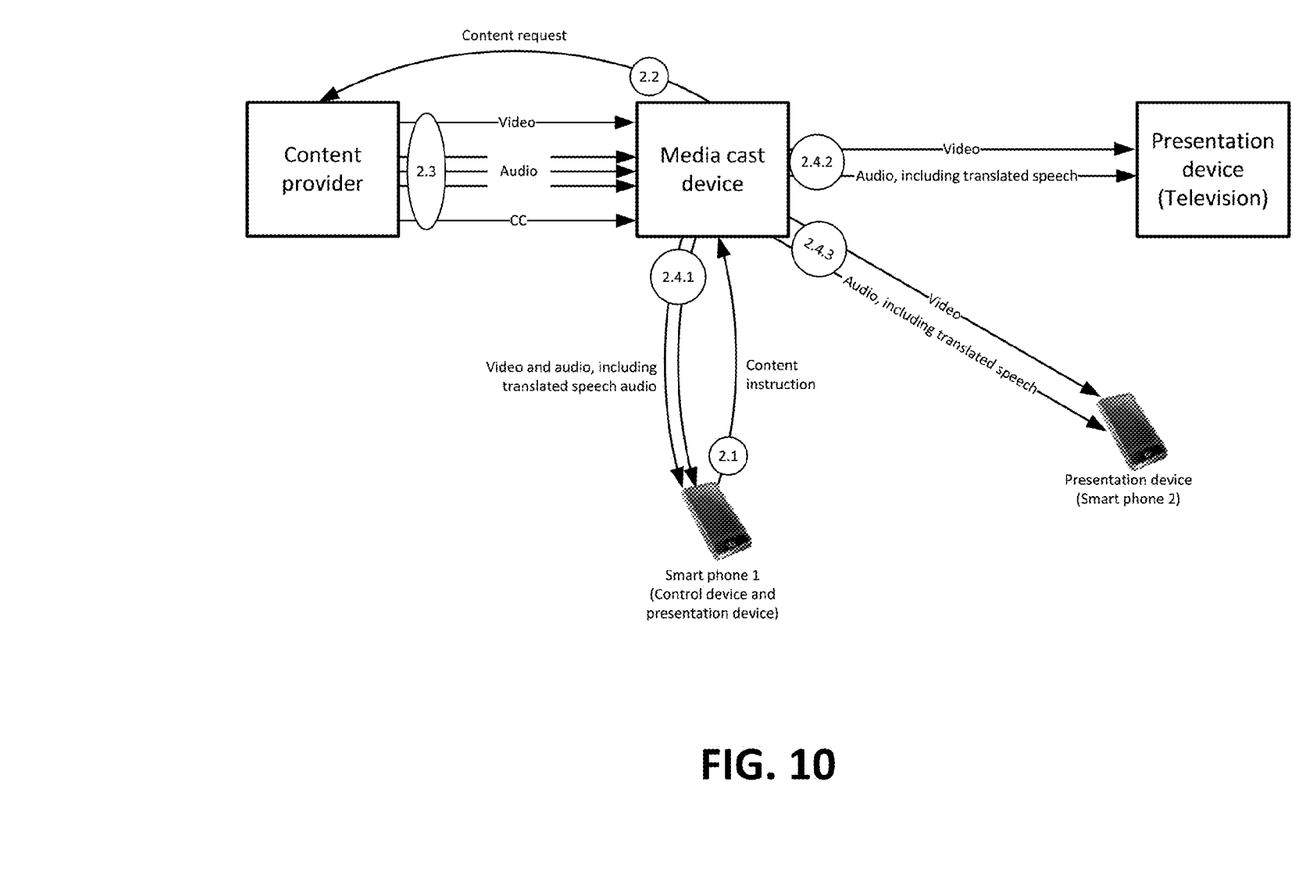
Figure 11:
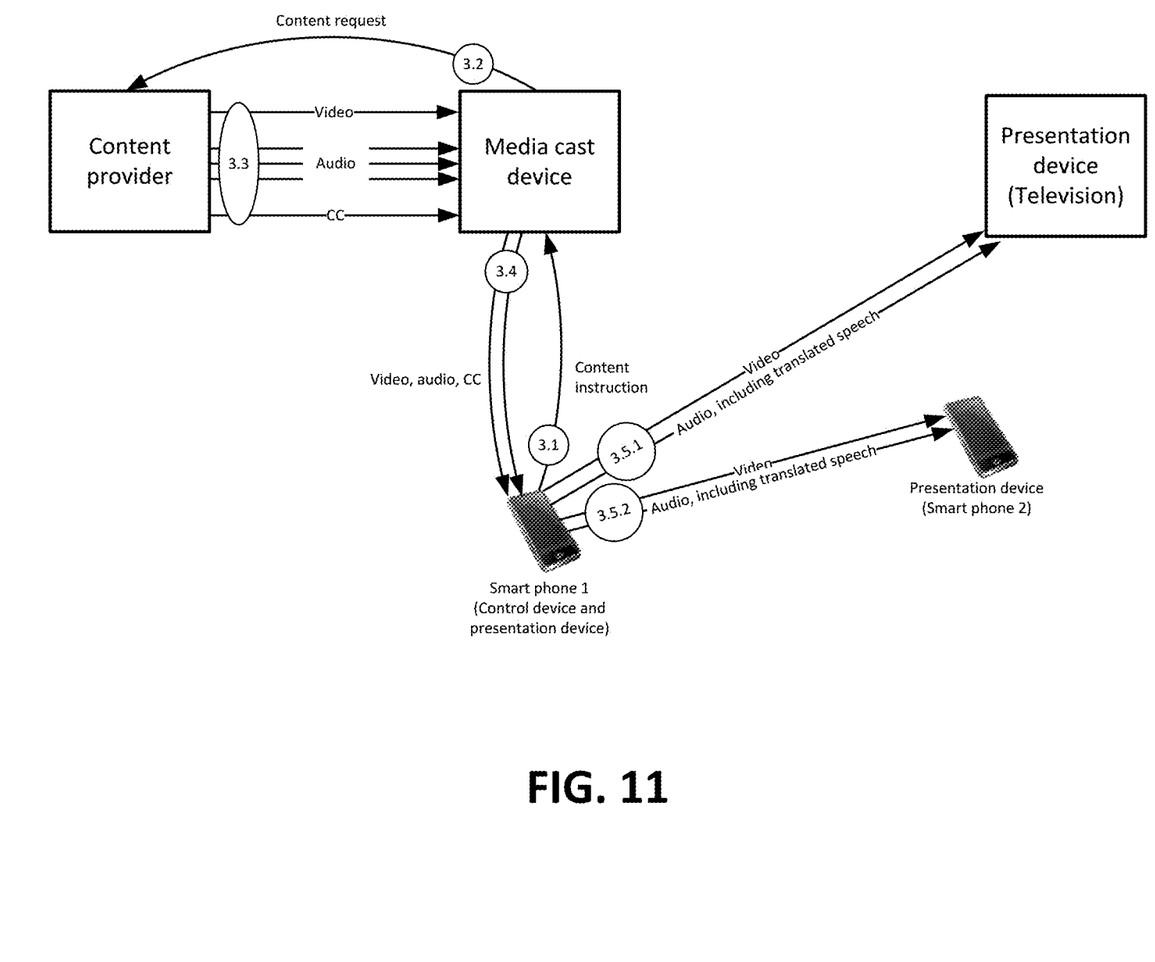

FIGS. 9-11 illustrate example implementations of generating and outputting multiple translated audio streams. For example, as shown in FIG. 9, a first smart phone ("Smart phone 1") may act as a control device and a presentation device. Smart phone 1 may output (at 1.1) a content instruction to a media cast device. The content instruction may include, for example, an address or another identifier of content, provided by a content provider. Based on the content instruction, the media cast device may request (at 1.2) the content from the content provider.

The content provider may provide (at 1.3) the content to the media cast device. For example, the content may be provided as multiple logical portions (and/or as a single logical stream, from which multiple portions may be extracted and/or identified). For example, a first portion may correspond to video, a second portion may correspond to audio, and a third portion may correspond to closed captioning information. As mentioned above, audio content may include multiple different logical streams (and/or an audio stream from which multiple different portions can be extracted and/or identified), such as speech-related audio and music/sound effects.

As further shown in FIG. 9, the media cast device may output (at 1.4) closed captioning information to Smart phone 1. The media cast device may also output (at 1.5) the sound effects ("FX")/music audio to a presentation device (e.g., a television). The television may have been previously designated as a presentation device to which the video and sound effects/music should be provided.

Smart phone 1 may implement functionality associated with translation component 320, and may generate translated audio streams based on the closed captioning information. Smart phone 1 may output (at 1.6) the translated speech audio to the television and to another smart phone ("Smart phone 2"). The translated speech audio may, for example, correspond to different languages. That is, audio corresponding to a first language may be provided to the television, while audio corresponding to a different language may be provided to Smart phone 2. In some implementations, Smart phone 1 may also play translated speech audio (e.g., the same audio as one of the other presentation devices and/or speech audio associated with a different language). In some implementations, the outputting (at 1.5 and 1.6) may be done in a synchronized manner, such that translated speech audio matches the original timing of original audio content, and/or matches the timing of the video content.

As shown in FIG. 10, Smart phone 1 may output (at 2.1) a content instruction to a media cast device, which may request (at 2.2) the content from a content provider. The content provider may provide (at 2.3) the content to the media cast device. In the example shown in FIG. 10, the media cast device may implement functionality associated with translation component 320. For example, the media cast device may generate translated audio streams in a manner similar to that described above.

The media cast device may output (at 2.4.1, 2.4.2, and 2.4.3) video and audio, including respective translated speech, to a set of presentation devices. For example, the media cast device may output the video and audio to Smart phone 1 (at 2.4.1), to Smart phone 2 (at 2.4.2), and to a television (at 2.4.3). In some implementations, the media cast device may output video to fewer than all of the presentation devices (e.g., only to the television).

As shown in FIG. 11, Smart phone 1 may output (at 3.1) a content instruction to a media cast device, which may request (at 3.2) the content from a content provider. The content provider may provide (at 3.3) the content to the media cast device. The media cast device may output (at 3.4) the content (e.g., the video content, the audio content, and the closed captioning information) to Smart phone 1. Smart phone 1 may generate translated audio content, and may output (at 3.5.1 and 3.5.2) the video and the translated audio content to a set of presentation devices (e.g., a television (at 3.5.1) and Smart phone 2 (at 3.5.2)).

While specific examples were described above with respect to FIGS. 9-11, in practice, other implementations are possible. Further, in some situations, a particular presentation device may be associated with an original language associated with obtained content. In some such situations, the original audio may be passed through to the particular presentation device (e.g., audio on which translation functions have not been performed).

Figure 12:
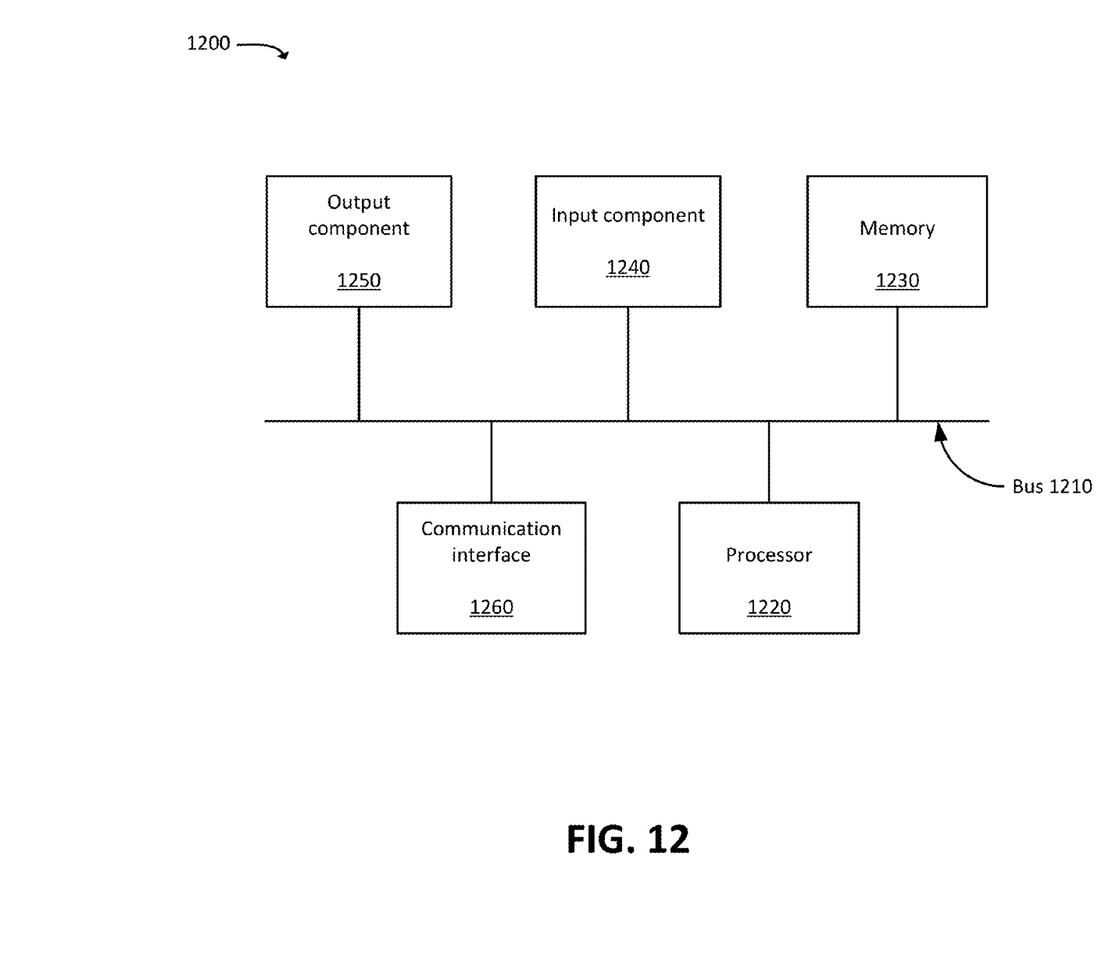
FIG. 12 illustrates example components of a device, in accordance with some implementations described herein.

FIG. 12 is a diagram of example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks have been described with regard to FIGS. 7 and 8, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
    receiving, by a first device, particular content, the particular content including:
        a plurality of audio streams that each correspond to a different channel of a surround sound audio configuration, wherein a particular one of the audio streams corresponds to a center channel of the surround sound audio configuration,
            wherein the plurality of audio streams correspond to audio associated with the particular content, and
        closed captioning information including a first set of text that corresponds to the audio associated with the particular content, the first set of text being associated with a first language;
    translating, by the first device, the first set of text to a second set of text that is associated with a second language;
    translating, by the first device, the first set of text to a third set of text that is associated with a third language;
    generating, by the first device, a first replacement audio stream that includes:
        the plurality of audio streams that each correspond to a different channel of the surround sound audio configuration, except for the particular audio stream that corresponds to the center channel of the surround sound audio configuration, and
        first translated audio that is based on the second set of text, in lieu of the particular audio stream that corresponds to the center channel of the surround sound audio configuration;
    generating, by the first device, a second replacement audio stream that includes:
        the plurality of audio streams that each correspond to a different channel of the surround sound audio configuration, except for the particular audio stream that corresponds to the center channel of the surround sound audio configuration, and
    second translated audio that is based on the third set of text, in lieu of the particular audio stream that corresponds to the center channel of the surround sound audio configuration;
    outputting, by the first device, the first replacement audio stream to a second device in a synchronized manner with respect to a video portion of the particular content; and
    outputting, by the first device, the second replacement audio stream to a third device in a synchronized manner with respect to the video portion of the particular content.

2. The method of claim 1, further comprising:
    playing, by the first device, at least one of:
        the first replacement audio stream, or
        the second replacement audio stream.

3. The method of claim 1, wherein the video portion of the particular content is presented by a fourth device, the fourth device being a separate device from the second device.

4. The method of claim 1, further comprising:
    outputting a content instruction to a media cast device, the content instruction including an identifier associated with the particular content,
    wherein the closed captioning information is received from the media cast device.

5. The method of claim 4, wherein the media cast device outputs a video portion of the particular content to a presentation device for display by the presentation device.

6. The method of claim 1, wherein the second and third devices are different user devices.

7. The method of claim 1, wherein the first device is a smart phone.

8. The method of claim 1, wherein the first device is a media cast device.

9. A first device, comprising:
a memory device storing a set of processor-executable instructions; and
a processor configured to execute the processor-executable instructions, wherein executing the computer-executable instructions causes the processor to:
receive closed particular content, the particular content including:
a plurality of audio streams that each correspond to a different channel of a surround sound audio configuration, wherein a particular one of the audio streams corresponds to a center channel of the surround sound audio configuration, and
closed captioning information, including a first set of text, associated with the particular content, the first set of text being associated with a first language;
translate the first set of text, to obtain:
a second set of text that is associated with a second language, and
a third set of text that is associated with a third language;
generate a first replacement audio stream that includes:
the plurality of audio streams that each correspond to a different channel of the surround sound audio configuration, except for the particular audio stream that corresponds to the center channel of the surround sound audio configuration, and
first translated audio based on the second set of text, in lieu of the particular audio stream that corresponds to the center channel of the surround sound audio configuration;
generate a second replacement audio stream that includes:
the plurality of audio streams that each correspond to a different channel of the surround sound audio configuration, except for the particular audio stream that corresponds to the center channel of the surround sound audio configuration, and
second translated audio based on the third set of text, in lieu of the particular audio stream that corresponds to the center channel of the surround sound audio configuration;
output the first replacement audio stream to a second device;
output a video portion of the content to second device such that the first replacement audio stream and the video portion of the content are synchronized;
output the second replacement audio stream to a third device; and
output the video portion of the content to third device such that the second replacement audio stream and the video portion of the content are synchronized.

10. The first device of claim 9, wherein executing the computer-executable instructions, to generate the first translated audio, causes the processor to:
generate the first translated audio using a text-to-speech conversion technique.

11. The first device of claim 9, wherein the video portion of the particular content is presented by a fourth device, the fourth device being a separate device from the second device.

12. The first device of claim 9, wherein executing the computer-executable instructions further causes the processor to:
output a content instruction to a media cast device, the content instruction including an identifier associated with the particular content,
wherein the closed captioning information is received from the media cast device.

13. The first device of claim 12, wherein the media cast device outputs the video portion of the particular content to a presentation device for display by the presentation device.

14. The first device of claim 9, wherein the second and third devices are different user devices.

15. The first device of claim 9, wherein the first device is one of:
a smart phone, or
a media cast device.

16. A method, comprising:
receiving, by a media cast device, a set of streams associated with particular content, the set of streams including:
a video stream,
a plurality of audio streams that each correspond to a different channel of a surround sound audio configuration, wherein a particular one of the audio streams corresponds to a center channel of the surround sound audio configuration, and
a closed captioning stream;
outputting, by the media cast device, a first subset, of the set of streams, to a presentation device, the first subset including:
the video stream, and
at least a first subset of the set of audio streams; and
outputting, by the media cast device, a second subset, of the set of streams, to a translation component, for generation of one or more sets of translated audio for concurrent presentation with the video stream, the second subset including at least one of:
at least a second subset of the set of audio streams, or
the closed captioning stream,
wherein the translation component generates a replacement audio stream based on the at least the second subset or the closed captioning stream, the replacement audio stream including:
the one or more of the plurality of audio streams that correspond to the different channels of the surround sound audio configuration, and
the translated audio in lieu of the audio stream that corresponds to the center channel of the surround sound audio configuration.

17. The method of claim 16, further comprising:
receiving a content instruction, identifying the particular content, from a user device,
wherein outputting the second subset, of the set of streams, to the translation component includes outputting the second subset, of the set of streams, to the user device.

18. The method of claim 16, wherein the first subset, of the set of audio streams, includes music or sound effects, and wherein the second subset, of the set of audio streams, includes speech audio.

19. The method of claim 18, further comprising:
extracting the speech audio from the set of audio streams, wherein the second subset, of the set of audio streams, is generated based on the extracting.

20. The method of claim 16, further comprising:
outputting the video stream and the second subset, of the set of audio streams, in a synchronized manner, to a presentation device.

\* \* \* \* \*